United States Patent [19]
Ruszkowski, Jr.

[11] Patent Number: 4,949,089
[45] Date of Patent: Aug. 14, 1990

[54] PORTABLE TARGET LOCATOR SYSTEM

[75] Inventor: Robert A. Ruszkowski, Jr., Fort Worth, Tex.

[73] Assignee: General Dynamics Corporation, Fort Worth, Tex.

[21] Appl. No.: 398,188

[22] Filed: Aug. 24, 1989

[51] Int. Cl.$^5$ ............................................. F41G 3/16
[52] U.S. Cl. .................................... 342/52; 342/357; 89/41.03
[58] Field of Search .................. 342/52, 357, 352, 54, 342/56, 58; 89/41.03

[56] References Cited

U.S. PATENT DOCUMENTS

| | | | |
|---|---|---|---|
| 3,715,953 | 2/1973 | Allan | 89/41.03 X |
| 4,232,313 | 11/1980 | Fleishman | 89/41.03 X |
| 4,741,245 | 5/1988 | Malone | 342/357 X |

Primary Examiner—Thomas H. Tarcza
Assistant Examiner—Mark Hellner
Attorney, Agent, or Firm—Andrew J. Dillon

[57] ABSTRACT

A portable target locator system capable of being transported and utilized by an individual combatant is disclosed. The portable target locator system comprises a rifle-like target locator and a transmitter/modem capable of transmitting target location coordinates to a weapons delivery system. The rifle-target locator preferably includes a Global Positioning System (GPS) receiver capable of determining the location coordinates of the target locator automatically and with a high degree of accuracy from signals transmitted from a network of orbiting satellites. A laser rangefinder and digital azimuth and inclination sensor are then utilized to accurately determine the range, azimuth and inclination of an identified target from the target locator. This information is then processed in conjunction with the location coordinates of the target locator to generate location coordinates for the selected target. The target location coordinates are then coupled to the transmitter/modem for transmittal to a remotely located control system, such as a weapons delivery system. In one preferred embodiment of the present invention a nonvolatile memory is provided and multiple target coordinate sets are then stored within the memory and subsequently transmitted to the weapons delivery system during a single transmission.

20 Claims, 3 Drawing Sheets

PORTABLE TARGET LOCATOR SYSTEM

BACKGROUND OF THE INVENTION

1. Field of the Invention:

This invention relates in general to the field of military activities involving the determination and coordination of target location information with various weapons delivery systems, and in particular to the field of target locator systems which accurately and automatically provide set of location coordinates for a selected target. Still more particularly, the present invention relates to such target locator systems which are capable of being transported and utilized by an individual combatant.

2. Description of the Prior Art:

Most prior art weapon systems may only be operated effectively when the location of the target for the weapon system is known in some coordinate system, such as latitude, longitude, and elevation above sea level. Land or sea based artillery will typically utilize target coordinates which are relative to the position of the artillery for accurate trajectory calculations and fire adjustments. Cruise missiles and other types of standoff weapons generally navigate to a predetermined target coordinate set which is stored in the weapon system memory. Tactical aircraft which are equipped with modern navigation and weapons delivery systems can typically deliver an unguided weapon to within fifty feet of a target, if the coordinates of the target are known prior to weapon delivery.

In such situations, if the target is a fixed object, such as a building or a bridge, providing target coordinate data to a weapons delivery system is a relatively simple matter. Fixed target locations are readily determined from maps, surveying, aircraft or satellite reconnaissance or other intelligence sources. However, the rapid and accurate determination of the coordinates of a non-fixed target is not a trivial matter. No system currently in service can accurately determine the coordinates of a non-fixed target and rapidly transmit those coordinates directly to a weapons delivery system or a weapons controlling organization in a timely manner. This problem is aggravated by the fact that mobile targets are the targets most often encountered by troops in a dynamic tactical environment, such as a battle front The various branches of the United States military services have attempted to solve this problem by employing several systems which aid in the location or designation of targets in a dynamic tactical environment. These prior art systems typically involve teams of observers who utilize specially equipped land vehicles, aircraft or cumbersome portable systems to either determine target location information and communicate it to weapons delivery system operators or to designate a target by laser illumination for special laser-homing weapons delivery systems. Despite these advances, many observer teams are still equipped with maps, compasses, and voice radios. These observer teams use visual range estimation and triangulation techniques to locate targets. This information is then typically transmitted to the weapons delivery system operators via voice radio.

All of these known target locator systems have one or more of the following deficiencies: the observer unit typically will not know its precise location and subsequently the target location data will be inaccurate; non-timely communication directly with the weapons system operators; and vulnerability and lack of mobility of the observer team due to system size or operating limitations. Additionally, no prior art system is fully integrated into a compact unit which may be utilized to determine precise target coordinates and then transmit that data in a format which may be utilized directly by a weapons delivery system or a weapons controlling organization.

For example, known systems exist which designate or illuminate a target for a prolonged period of time with a laser so that specialized weapons systems may home in on the laser energy scattered off the target. These systems have several disadvantages associated therewith. Firstly, there must be a sufficient coordination between the observer units and the weapons delivery system operators well in advance of any operation. Secondly, the weapons delivery system must be equipped with the specialized laser-homing ordinance, and thirdly, the observer teams must be advised to begin illuminating a target just before the ordinance is to be employed. Additionally, the observer teams utilizing this system are placed at greater risk of being located by the enemy since they must illuminate the target for a prolonged period of time from a fixed location.

Most problems associated with current target locator systems are compounded for the typical situation wherein tactical aircraft, equipped with unguided ordinance, are being utilized for Close Air Support (CAS) operations, where friendly forces are in proximate contact with the enemy forces. Target location data provided to these aircraft may typically be as recent as ten minutes old or twenty-four hours old before it is acted upon. Additionally, this information is typically received by voice radio in the form of target briefings. The potential ineffectiveness of conducting Close Air Support operations while utilizing such methods is obvious, especially when the intended targets are mobile and the ordinance employed is not "smart." This situation typically forces a pilot to locate targets visually near the last known target coordinate set and make the appropriate corrections during his attack run. This technique may cause the pilot to remain exposed over a target area for a prolonged period of time searching for the target, thereby increasing his vulnerability to surface to air threats. Additionally, the potential for fratricide or ineffectiveness due to uncertainty become substantially greater.

It should therefore be apparent that there exists a need for a target locator system which can provide real time, updated and accurate target coordinate data directly to various weapons delivery systems to increase their effectiveness in a dynamic tactical environment.

SUMMARY OF THE INVENTION

It is therefore one object of the present invention to provide an improved target locator system.

It is another object of the present invention to provide an improved target locator system capable of automatically providing accurate target location coordinates for a selected target.

It is yet another object of the present invention to provide an improved target locator system capable of automatically providing accurate target location coordinates for a selected target which may be transported and utilized by an individual combatant.

The foregoing objects are achieved as is now described. The portable target locator system of the present invention comprises a rifle-like target locator and a transmitter/modem capable of transmitting target location coordinates to a weapons delivery system. The rifle-target locator preferably includes a Global Positioning System (GPS) receiver capable of determining the location coordinates of the target locator automatically and with a high degree of accuracy from signals transmitted from a network of orbiting satellites. A laser rangefinder and digital azimuth and inclination sensor are then utilized to accurately determine the range, azimuth and inclination to a visually identified target from the target locator. This information is then processed in conjunction with the location coordinates of the target locator to generate accurate location coordinates for the selected target. The target location coordinates are then coupled to the transmitter/modem for transmittal to a weapons delivery system. In one preferred embodiment of the present invention a nonvolatile memory is provided and multiple target coordinate sets are stored and subsequently transmitted during a single transmission.

The above as well as additional objects, features, and advantages of the invention will become apparent in the following detailed description.

BRIEF DESCRIPTION OF THE DRAWING

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
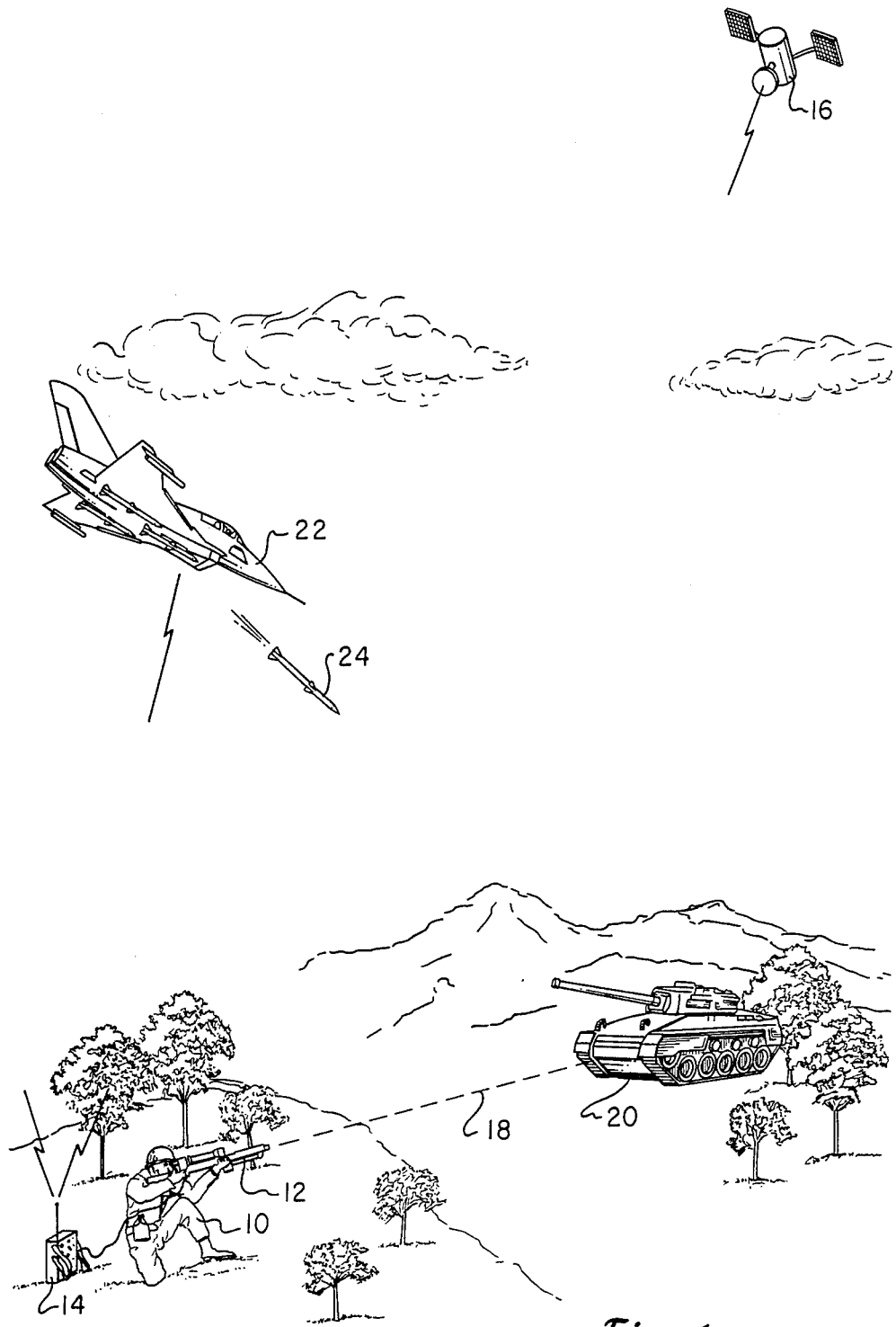
FIG. 1 is a pictorial representation of the utilization of the portable target locator system of the present invention.

With reference now to the figures and in particular with reference to FIG. 1, there is depicted a pictorial representation of the utilization of the portable target locator system of the present invention. As may be seen, the portable target locator system of the present invention may be transported and utilized by a single combatant 10. The target locator system comprises a rifle-like target locator 12 and an associated transmitter/modem 14. As will be explained in greater detail herein, target locator 12 may be utilized to receive signals transmitted by a network of orbiting Global Positioning System (GPS) satellites 16. These satellite signals are then processed to automatically determine the location coordinates of target locator 12 with a high degree of accuracy.

A laser pulse 18, transmitted by target locator 12, is then utilized to determine the range from target locator 12 to tank 20 or another suitable target. This information, along with azimuthal and inclination data, is then utilized to accurately calculate the location coordinates of tank 20 for transmission via transmitter/modem 14 to a remotely located control system, such as tactical aircraft 22. Thereafter, tactical aircraft 22 will launch a rocket or other weapon 24 to proceed to the location coordinates of tank 20. In this manner, a lone combatant may automatically and accurately determine the location coordinates of one or more tactical targets and transmit those locations directly to a weapons delivery system, such as tactical aircraft 22.

Figure 2:
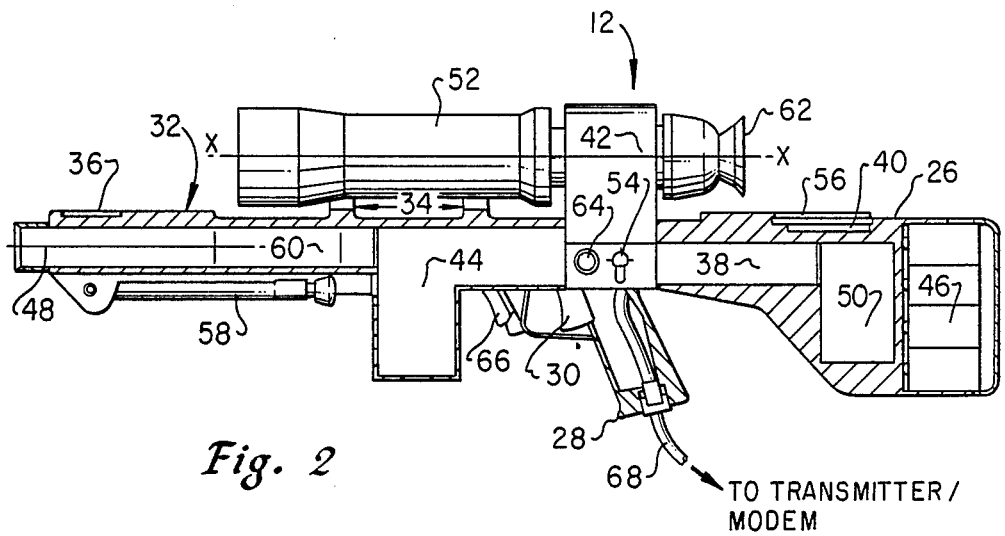
FIG. 2 is a schematic, partially sectional view of the rifle-like target locator of the portable target locator system of the present invention.

Referring now to FIG. 2, there is depicted a schematic, partially sectional view of the rifle-like target locator 12, which is utilized with the portable target locator system of the present invention. As may be seen, target locator 12 is configured in a rifle-like configuration including a butt stock 26, hand grip 28 and barrel assembly 32. Laser trigger 30 may be utilized, in accordance with the procedures described herein, to energize a laser rangefinder and to synchronize the other activities of target locator 12.

As is illustrated, target locator 12 includes a plurality of scope mounts 34, which preferably may be utilized to mount an optical sighting system which is utilized to direct the laser rangefinder contained within target locator 12. Those skilled in the art will appreciate that multiple scope mounts 34 are provided so that the optical sighting system utilized may be easily changed to accommodate various lighting and distance requirements.

Mounted within barrel assembly 32 is a Global Positioning System (GPS) receiving antenna 36. GPS receiver antenna 36 is utilized to receive signals transmitted from the NAVSTAR Global Positioning System (GPS). The Global Positioning System (GPS) is comprised of a network of orbiting satellites which transmit signals to specialized receivers for processing whereby the location of the receiver may be determined anywhere on the face of the earth. A GPS receiver may typically determine its absolute location coordinates to within an accuracy of several meters and can continuously update its position as it is moved. Currently, GPS receivers can be manufactured in sizes as small as a hand-held calculator. The signals received by GPS receiver antenna 36 are then coupled to GPS processor 38 which is then utilized to determine the absolute coordinates of target locator 12.

In the event the GPS capability is disabled or unavailable, the operator of the system may manually input his location, deriving the location from maps, surveying or other means, via data entry keypad 40. Data entry keypad 40 is preferably mounted beneath keypad access cover 56, which is utilized to prevent moisture or other contaminants from damaging data entry keypad 40. Of course, those skilled in the art will appreciate that it is also possible to provide a target locator system which may receive a location coordinate data set from an external GPS receiver unit. In either event, once the absolute coordinates of target locator 12 have been determined by GPS processor 38, or by manual or remote entry of comparable information, then the location coordinates of a target may be automatically and accurately determined so long as the azimuth, inclination and range from the target to target locator 12 may be accurately determined.

A key feature of target locator 12 is laser rangefinder 48. Laser rangefinder 48 is preferably an integrated laser rangefinder which utilizes a very short (preferably less than a half second) burst of laser energy, which is transmitted in a pulsed beam at the desired target upon the activation of laser trigger 30. The transmitted burst of laser energy will then scatter as it impacts the target. The elapsed time difference between the initial transmission of the burst of laser energy and the detection of the scatter by laser rangefinder 48 may then be utilized to calculate the range of the target from target locator 12. Typical accuracies associated with known laser rangefinders are plus or minus five meters and it is well known that ranges may be determined utilizing such devices out to ten thousand meters or more. Those skilled in the navigation art will appreciate that this range data accuracy is within the error of the GPS determined coordinates for tarqet locator 12, although the error is cumulative. Typically, the range to potential targets with such a system will be three thousand to five thousand meters, when such targets are being located for weapon system employment. Additionally, many current available laser rangefinders are eye-safe, thereby allowing their unrestricted use in training environments. Thus, an eye-safe laser rangefinder is an ideal technology to utilize for obtaining accurate range information to targets and, in accordance with current state-of-the-art processes, may be easily integrated into target locator 12, in the manner disclosed herein.

Next, the azimuth and elevation angles associated with laser rangefinder 48 must be determined. These values are critical components in a polar coordinate system which will be utilized to determine the position coordinates of the target relative to target locator 12. To this end, azimuth and elevation sensor 50 is provided within target locator 12 and will preferably be provided by utilizing clusters of inclinometers or magnetic sensors. These sensors typically utilize the earth's magnetic field and are therefore susceptible to the natural and unnatural non-uniformities associated with the earth's magnetic field and the subsequent errors which these non-uniformities may induce. These errors are mainly associated with the azimuthal angular measurement, or the angle that the line of sight from the observer to the target makes with true North. This occurs mainly because the magnetic North and South poles of the earth do not correspond to the classic geometric poles which are utilized to define latitude and longitude. Thus, as will be explained in greater detail herein, a preferred embodiment of the present invention will incorporate a method whereby local magnetic variation, as a function of the location of target locator 12, may be stored within system memory and utilized to correct the output of digital magnetic azimuth and elevation sensor 50.

In accordance with the description above, those skilled in the art will appreciate that by accurately and automatically determining the location coordinates of target locator 12 by the utilization of Global Positioning System (GPS) signals and incorporating the range, azimuth and inclination to a desired target, as determined by measurements from target locator 12, it will be possible utilizing processor 44 to accurately determine the position coordinates for any desired target. Of course, processor 44 is preferably provided utilizing an appropriately programmed microprocessor such that the conversion from a set of polar coordinates with respect to target locator 12 may be easily accomplished to render the position coordinates of the target into a system of coordinates which is directly utilizable by a weapons delivery system.

Still referring to FIG. 2, those skilled in the art will appreciate that a plurality of batteries 46 may be utilized to provide sufficient electrical power to the various electronic components described within target locator 12. Additionally, batteries 46 may be utilized to charge capacitor 60 to a sufficient voltage such that discharge of capacitor 60 may be utilized in the transmission of a short burst of laser.

As is illustrated, target locator 12 also preferably includes a sighting system 52 which is mounted to target locator 12 via scope mounts 34. Sighting system 52 is preferably an optical sighting system which may or may not include light amplification for utilization at night. Sighting system 52 is preferably mounted along a line with laser rangefinder 48 so that the operator of target locator 12 may simply and easily visually locate a potential target and "hit" that target with a short burst from laser range finder 48.

A display 42 is preferably included with sighting system 52 and may be integrated therein such that digital data may be superimposed on the visual image produced by sighting system 52. Of course, those skilled in the art will appreciate that sighting system 52 may also comprise an electronic video system such that superimposition of digital data may be easily integrated. A flexible eye piece 62 is also provided with sighting system 52 such that the operator may peer through sighting system 52 for long periods of time without suffering physical discomfort.

Upon reference to the foregoing specification, those skilled in the art will appreciate that target locator 12 may be pointed and aimed in much the same manner as a rifle to automatically and accurately determine the location coordinates of a potential target. In order to increase the accuracy with which target locator 12 may be pointed, one embodiment of the present invention includes a retractable bipod 58 which may be extended and utilized to stabilize barrel assembly 32 thereby enhancing the accuracy with which laser rangefinder 48 may be aimed.

A mode select switch 54 is also provided and is utilized to place target locator 12 in a single target or multiple target mode of operation, in a manner which will be explained in greater detail herein. Also disclosed in FIG. 2 is an ID select button 64, which may be utilized by the operator of target locator 12 to page through a plurality of target identification indicia stored within memory associated with processor 44, so that it will be possible to transmit target identification information in conjunction with the location coordinates of the target. In this manner, a weapons delivery system may efficiently determine what manner of weapon is best suited for utilization against a particular target. Finally, after determining the position coordinates for a selected target and optionally selecting target identification indicia to be transmitted with those coordinates, the operator of target locator 12 may simply depress transmit trigger 66 and thereby transmit the position coordinates of the target and its identifying indicia to transmitter/modem 14 (see FIG. 1) via wiring harness 68.

Figure 3:
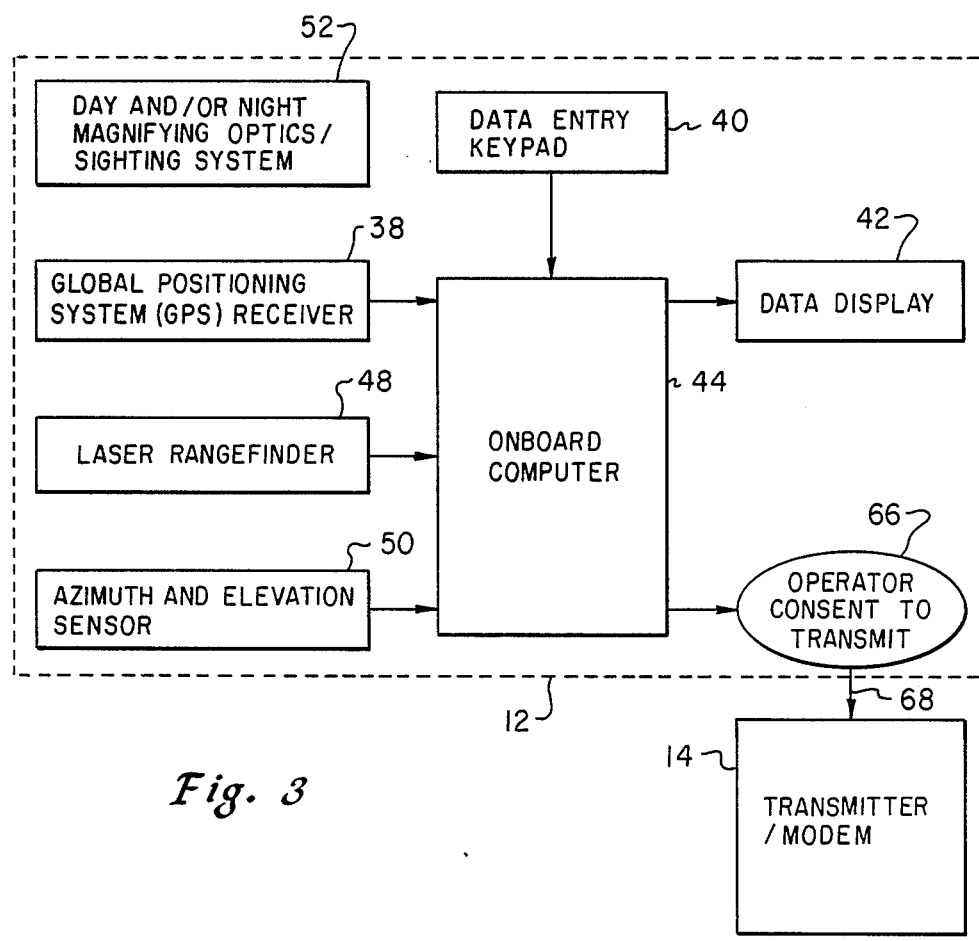
FIG. 3 is a basic functional block diagram of the portable target locator system of the present invention.

With reference now to FIG. 3, there is depicted a basic functional block diagram of the portable target locator system of the present invention. In each case herein, the individual blocks within FIG. 3 which correspond to features of FIGS. 1 and 2, have been labeled with reference numerals which correspond to the reference numerals previously utilized in FIGS. 1 and 2. As is illustrated, day and/or night magnifying optics/sighting system 52 is utilized by the operator of target locator 12 to accurately aim the system at selected targets, as well as aiding in the identification of those targets.

Inputs from the Global Positioning System (GPS) processor 38, laser rangefinder 48 and azimuth and elevation sensor 50 and/or data entry keypad 40 are then coupled to processor 44. Processor 44 then calculates the coordinates of the selected target, utilizing the observer's coordinates, as determined by the GPS system, and the relative range, azimuth and elevation data of the target relative to the position of target locator 12. These values are preferably simultaneously collected by target locator 12 when the operator depresses laser trigger 30 (see FIG. 2).

In this manner, target coordinate data may be mathematically resolved into an appropriate coordinate system by processor 44 and displayed to the operator of target locator 12 for review via display 42. Once the operator is confident of the validity of this target data he may also supplement that information with some type of target identification indicia as described above. This target data set may then be transmitted directly to a weapons delivery system or a weapons controlling organization which is equipped with a compatible receiver/modem via transmitter/modem 14. Of course, this information may also be stored in non-volatile memory for delayed transmission or future reference.

Figure 4:
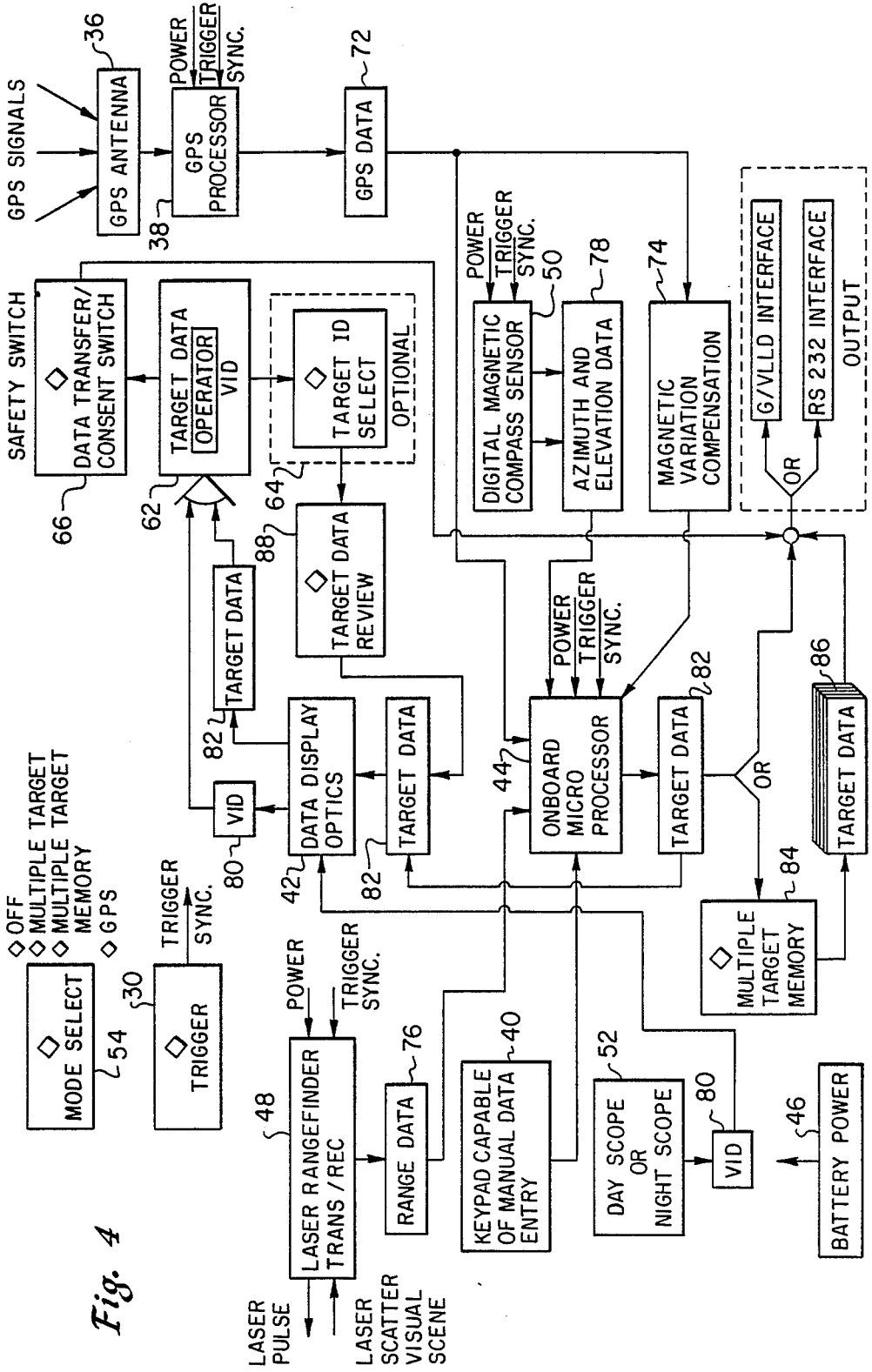
FIG. 4 is a more detailed functional block diagram of the portable target locator system of the present invention.

Referring now to FIG. 4, the operation of the portable target locator system of the present invention will be described. Again, individual blocks within FIG. 4 which correspond to features of the earlier figures, have been labeled with reference numerals which correspond to the reference numerals previously utilized. Initially, the process begins when the operator visually identifies (VID 80) a potential target with his eyes, sighting system 52 or some other visual device, such as binoculars. Next, the operator activates target locator 12 for target coordinate processing utilizing mode select switch 54. The operation of mode select switch 54 prompts GPS processor 38 to determine the current location of target locator 12 by utilizing the GPS satellite-emitted signals which are received through GPS receiver antenna 36. GPS data 72 is then directly coupled to processor 44.

In the event the GPS signals are not received, or the GPS processor has been disabled, the operator is preferably prompted, via display 42, to enter the required position information on data entry keypad 40. As discussed above, in such cases the location of target locator 12 may be derived from a map, surveying or some other reference. The data entered will then preferably be displayed via display 42 and transmitted to processor 44. Those skilled in the art will appreciate that when GPS capability is available, the current coordinates of target locator 12 may be updated automatically.

Activating target locator 12 by utilizing mode select switch 54 also preferably enables azimuth and elevation sensor 50. Azimuth and elevation data 78, when transmitted to processor 44, may be corrected for local magnetic variation based upon the current location of target locator 12. If magnetic variation compensation data 74 is not available, the operator would again be prompted via display 42 to enter the local magnetic variation manually on data entry keypad 40. This data may be derived from most types of tactical maps, although those skilled in the art will appreciate that this technique is not as accurate as may be desired.

Next, the operator of target locator 12 preferably utilizes sighting system 52 to aim target locator 12 at a selected target. Sighting system 52 preferably will include variable image magnification settings and may be aimed and "fired" from whatever position the operator elects. The most common method of "firing" target locator 12 will probably be from a prone position on the ground. To better facilitate this firing position target locator 12, as described above, preferably includes a retractable bipod 58, that may be utilized to stabilize the aim of target locator 12.

To operate target locator 12, the operator will pull laser trigger 30 to a first detent position. This position begins the charging of laser rangefinder capacitor 60. When capacitor 60 is ready to be discharged, a ready indication will preferably be shown on display 42 of sighting system 52. At this point, the operator continues to pull laser trigger 30 to the second detent position to "fire" target locator 12. This action simultaneously discharges laser rangefinder 48 and initiates the sampling of the currently sensed azimuth and elevation angular data, as determined by azimuth and elevation sensor 50. These three inputs constitute a polar coordinate data set of the target, relative to the position of target locator 12. This data is then transmitted to processor 44, which then calculates the absolute coordinates of the target by utilizing this polar coordinate data set and the current position of target locator 12.

Next, the calculated target coordinates, along with the measured range, azimuth and elevation, are preferably displayed, via display 42, for review by the operator. The operator may then check the information with a map to determine the rough validity of the data, or utilize his own judgment for this purpose. In the event the operator misses the target with laser rangefinder 48, he may repeat the process as many times as necessary until he is satisfied with the validity of the data.

At this point, the operator of target locator 12 has the option of adding a target identification code to the coordinate data set, by utilizing ID select button 64. Each depression of ID select button 64 will cause processor 44 to display the next possible target identification indicia in a finite list which is stored within processor 44. The currently selected target code is preferably displayed on display 42 and will be included in the transmitted target coordinate data set, if elected.

The operator of target locator 12 may also utilize mode select switch 54 to prepare target locator 12 for transmission of the target position coordinate data set to a weapons delivery system or controlling organization via transmitter/modem 14, or storage of the data in a non-volatile memory, such as multiple target memory 84, for delayed transmission or reference. In the multiple target mode of operation, as determined by mode select switch 54, the position coordinates for a plurality of targets may be stored within multiple target memory 84 and then transmitted as a group of target data sets 86. Such transmission will occur upon the election of the operator and the depression of transmit trigger 66 to consciously consent to the transmission of target coordinate data and identification codes. It is anticipated that in a continuous updating mode of operation it would not be necessary to consent to each target coordinate set since many consecutive shots at the target will be taken.

This converted target coordinate data, having been determined by target locator 12 and transmitted via transmitter/modem 14 will then be processed by a compatible receiver/modem at a weapons delivery system. The receiver/modem could be a self-contained man-portable device with a data display or may be integrated directly into a weapons system's electronic suite. If the receiver/modem is a self-contained device, the operator of this unit could then read the target coordinate data that is received and displayed and utilize this information manually to direct artillery, for example.

Those skilled in the art will appreciate that while the portable target locator system of the present invention is disclosed in a man-portable configuration a target locating system constructed in this manner may be implemented in a manned or unmanned airborne vehicle. This is feasible due to the fact that by utilizing the GPS system it is possible to continually update the position of the target locating system and the fact that the range, azimuth and elevation measurement of a target are sensed almost instantaneously.

Additionally, those skilled in the art will appreciate that it is not necessary that the target coordinate data be transmitted in real time to the attacking weapons delivery system. It may be more feasible to collect target coordinate data and store that data in a non-volatile memory of a portable covert transmitter "cell" that would be left near the intended target. At some later time an attacking weapons delivery system which is heading for the general target area may electronically interrogate the area for this covert transmitter. After contact with the transmitter cell is confirmed, the precise target coordinates could be transmitted to the approaching weapons delivery system. The covert transmitter cell will then preferably self-destruct after interrogation and transmission of the target coordinate data to prevent compromising the system.

Although the invention has been described with reference to a specific embodiment, this description is not meant to be construed in a limiting sense. Various modifications of the disclosed embodiment as well as alternative embodiments of the invention will become apparent to persons skilled in the art upon reference to the description of the invention. It is therefore contemplated that the appended claims will cover any such modifications or embodiments that fall within the true scope of the invention.

What is claimed is:

1. A portable target locator system for determining the location coordinates of a selected target and coupling said coordinates to a remotely located control system, said portable target locator system comprising:
    location determination means for accurately and automatically determining the location coordinates of said portable target locator system;
    rangefinder means for determining the range from said portable target locator system to a selected target;
    azimuth sensor means for determining the azimuth from said portable target locator system to said selected target;
    processor means coupled to said location determination means, said rangefinder means and said azimuth sensor means for determining the location coordinates of said selected target; and
    communication means for coupling said location coordinates of said selected target to said remotely located control system.

2. The portable target locator system according to claim 1 wherein said location determination means comprises a Global Positioning System receiver for receiving satellite transmitted signals and means for processing said satellite transmitted signals to accurately and automatically determine the location coordinates of said portable target locator system.

3. The portable target locator system according to claim 1 wherein said rangefinder means comprises a laser rangefinder including means for transmitting a short burst of laser energy and means for detecting the scattering of said burst at said selected target.

4. The portable target locator system according to claim 3 further including an optical sighting device for sighting said laser rangefinder.

5. The portable target locator system according to claim 1 wherein said azimuth sensor comprises a digital magnetic compass.

6. The portable target locator system according to claim 4 further including an inclination sensor means for measuring the inclination from horizontal of said optical sighting device and wherein said processor means is coupled to said location determination means, said rangefinder means, said azimuth sensor means and said inclination sensor means for determining the location coordinates of said selected target.

7. The portable target locator system according to claim 1 wherein said processor means comprises an appropriately programmed microprocessor.

8. The portable target locator system according to claim 1 wherein said communication means comprises a radio frequency transmitter.

9. A portable target locator system for determining the location coordinates of selected targets and coupling said coordinates to a weapons delivery system, said portable target locator system comprising:
    location determination means for accurately and automatically determining the location coordinates of said portable target locator system;
    rangefinder means for determining the range from said portable target locator system to a selected target;
    azimuth sensor means for determining the azimuth from said portable target locator system to said selected target;
    processor means coupled to said location determination means, said rangefinder means and said azimuth sensor means for determining the location coordinates of said selected target;
    memory means coupled to said processor means for storing said location coordinates of said selected target; and
    communication means coupled to said memory means for coupling said location coordinates of said selected target to said weapons delivery system.

10. The portable target locator system according to claim 9 wherein said location determination means comprises a Global Positioning System receiver for receiving satellite transmitted signals and means for processing said satellite transmitted signals to accurately and automatically determine the location coordinates of said portable target locator system.

11. The portable target locator system according to claim 9 wherein said rangefinder means comprises a laser rangefinder including means for transmitting a short burst of laser energy and means for detecting the scattering of said burst at said selected target.

12. The portable target locator system according to claim 11 further including an optical sighting device for sighting said laser rangefinder.

13. The portable target locator system according to claim 9 wherein said azimuth sensor comprises a digital magnetic compass.

14. The portable target locator system according to claim 12 further including an inclination sensor means for measuring the inclination from horizontal of said optical sighting device and wherein said processor means is coupled to said location determination means, said rangefinder means, said azimuth sensor means and said inclination sensor means for determining the location coordinates of said selected target.

15. The portable target locator system according to claim 9 wherein said processor means comprises an appropriately programmed microprocessor.

16. The portable target locator system according to claim 9 wherein said communication means comprises a radio frequency transmitter.

17. The portable target locator system according to claim 9 wherein said memory means stores the location coordinates of a plurality of selected targets and wherein said communication means couples the location coordinates of said plurality of selected targets to said weapons delivery system.

18. A portable target locator system for determining the location coordinates of selected targets and coupling said coordinates to a weapons delivery system, said portable target locator system comprising:
 a rifle-like target locator including:
  location determination means within said rifle-like target locator for accurately and automatically determining the location coordinates of said portable target locator system;
  rangefinder means within said rifle-like target locator for determining the range from said portable target locator system to a selected target;
  azimuth sensor means within said riflelike target locator for determining the azimuth from said portable target locator system to said selected target;
  processor means within said rifle-like target locator coupled to said location determination means, said rangefinder means and said azimuth sensor means for determining the location coordinates of said selected target;
  memory means within said rifle-like target locator coupled to said processor means for storing said location coordinates of said selected target and a plurality of target identification indicia;
  target selection means within said rifle-like target locator for permitting an operator to select a particular one of said plurality of target identification indicia; and
  communication means coupled to said memory means for coupling said location coordinates of said selected target and said particular one of said plurality of target identification indicia to said weapons delivery system.

19. The portable target locator system according to claim 18 wherein said location determination means comprises a Global Positioning System receiver for receiving satellite transmitted signals and means for processing said satellite transmitted signals to accurately and automatically determine the location coordinates of said portable target locator system.

20. The portable target locator system according to claim 18 wherein said rangefinder means comprises a laser rangefinder including means for transmitting a short burst of laser energy and means for detecting the scattering of said burst at said selected target.

* * * * *